C. MANN.
FRUIT PICKER.
APPLICATION FILED DEC. 9, 1914.

1,157,025.

Patented Oct. 19, 1915.
2 SHEETS—SHEET 2.

WITNESSES
Muriel D. Griffin
Howard R. Ives

INVENTOR
Colin Mann
by Elgin Leverill
Attorney

UNITED STATES PATENT OFFICE.

COLIN MANN, OF SOUTHPORT, MAINE.

FRUIT-PICKER.

1,157,025.     Specification of Letters Patent.     Patented Oct. 19, 1915.

Application filed December 9, 1914. Serial No. 876,373.

*To all whom it may concern:*

Be it known that I, COLIN MANN, a subject of Great Britain, residing at Southport, in the county of Lincoln and State of Maine, have invented certain new and useful Improvements in Fruit-Pickers, of which the following is a specification.

Fruits which require the use of a picker are those which grow on the high branches, and it is difficult to position the picker to receive and pick the fruit without injury to the one being picked and without disturbing those on the nearby branches. This is especially true of pickers which have two jaws, one or both of which are movable. Again, the fruit generally hangs pendent and where the movable jaw moves upwardly it is very difficult to engage it so as to prevent injury to the fruit.

The object of my invention is to provide a simple fruit picker, designed to overcome these objections, to be easily operable and to do the picking without injury to the fruit.

Figure 1:
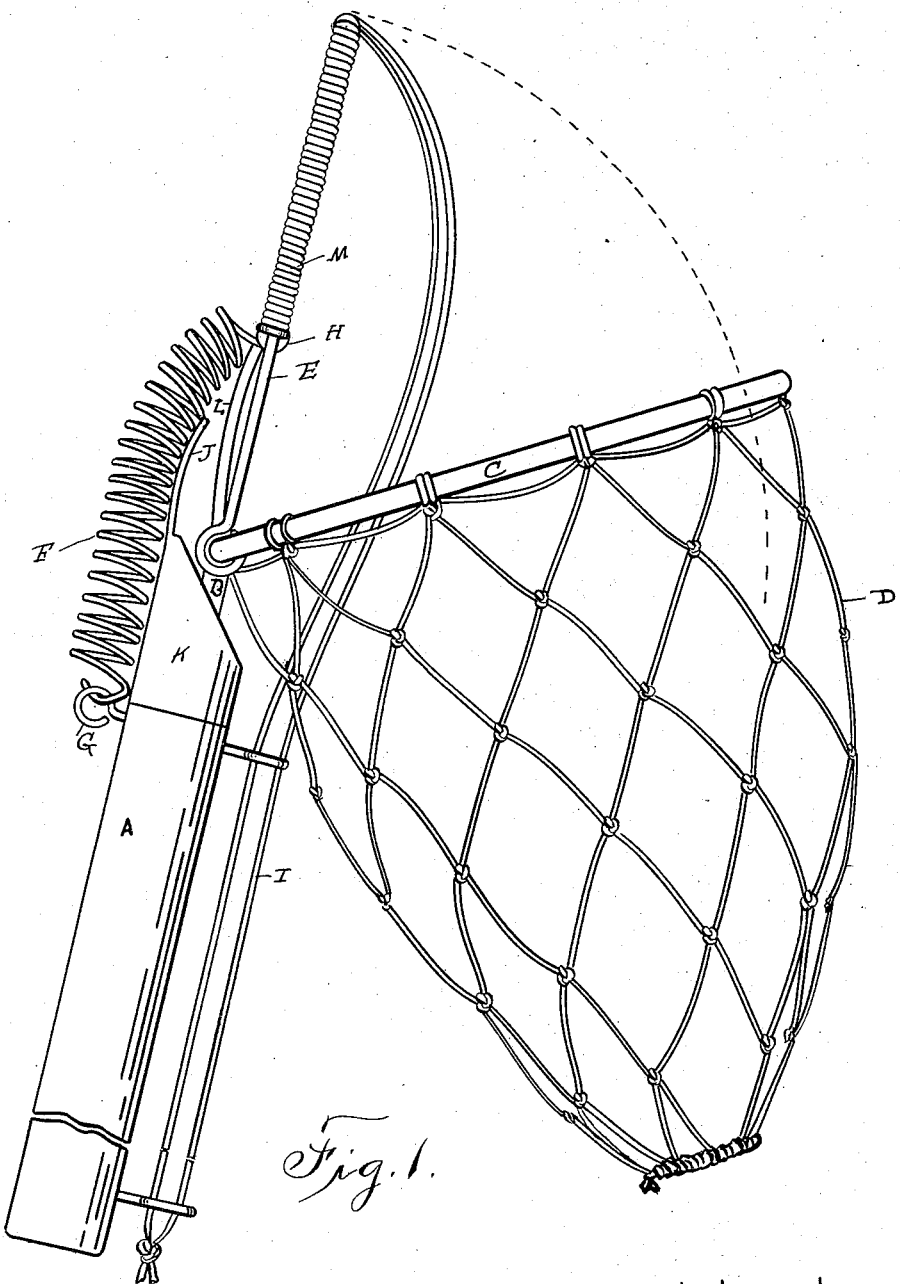
Figure 2:
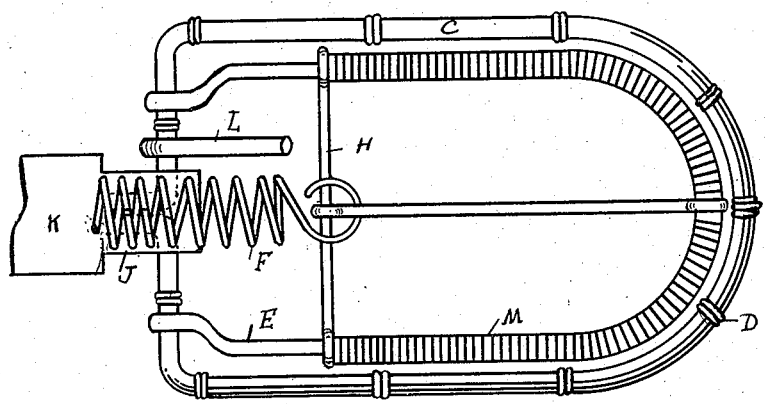
Figure 3:
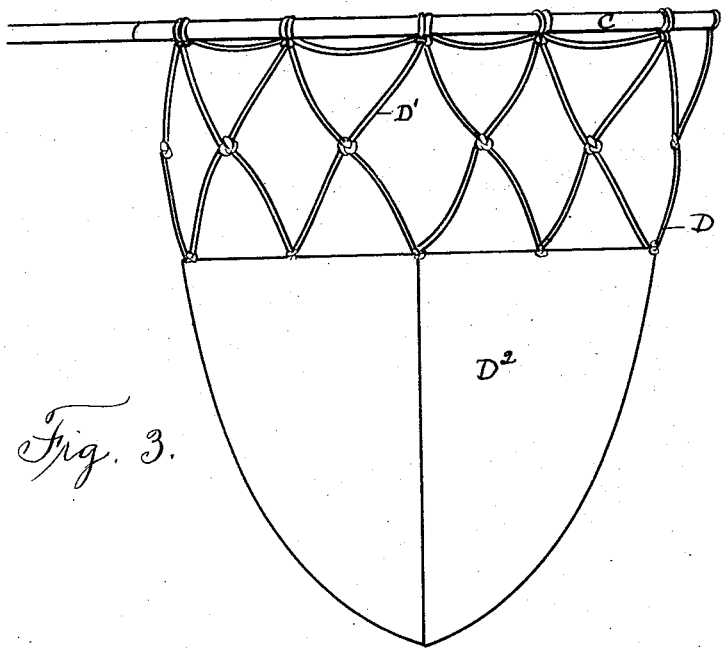

In the drawing herewith accompanying and making a part of this application Figure 1 is a side elevation of my picker having about the inclination of the pole that it would have in actual use, being slightly inclined from the perpendicular; Fig. 2 is a plan view of Fig. 1, some parts being omitted for clearness, and Fig. 3 is a side elevation of the fixed jaw showing a modified form of the fruit receptacle.

Same reference characters indicate like parts in the several figures.

In said drawing A is a pole to the end of which is rigidly attached a jaw C which may be made of any suitable material, preferably of heavy wire. The method of attaching the fixed jaw to the pole is not material, but preferably by means of a tang B made integral with the jaw and inserted in the end of the pole. The fixed jaw C is nearly at right angles to the pole so as to be nearly horizontal when the picker is being used so that it may be raised in horizontal position directly under the fruit affording a large unobstructed entrance to the receptacle D attached to the under side thereof. The receptacle may be netted, as seen in Fig. 1. It may be made of a combination of net D' and solid fabric D², the netted portion being uppermost as shown in Fig. 2. The reason for the combination receptacle is that the netted part affords a view of the fruit being picked while the fabric part is much less liable to become entangled in the branches.

In connection with the fixed jaw is a movable jaw E pivotally secured at or near the pole end of the fixed jaw. The movable jaw is of such size that when desired it may be pulled down and below the fixed jaw as indicated by the dotted lines in Fig. 1. This jaw is automatically retracted by a coil spring F, one end of which is attached to the pole, as seen at G, and the other to a cross bar H on the movable jaw. The movable jaw is operated by means of a cord I attached one end to the outer end of the jaw and the other extending down to the handle end of the pole. To give a long easy movement to the coil spring, it is made to bear upon a curved extension J forming a part of a ferrule K secured to the end of the pole. The backward movement of the movable jaw is limited by a stationary post L which may be formed or secured to the stationary jaw. The movable jaw may be provided with a soft cushion M.

The operation of my picker is as follows: The movable jaw is normally raised as in the position shown in Fig. 1. The picker as a whole is usually raised in an inclined position such that the fixed jaw will come horizontally under the fruit. The movable jaw is then drawn down upon the fruit and continued until the fruit is forced from the branch which then falls into the receptacle, the action of the movable jaw being that of pressure only, the movable jaw being cushioned to further lessen the liability of injury to the fruit by the pressure of the movable jaw thereupon.

I claim:

1. In a fruit picker, a pole, a long horseshoe-shaped fixed jaw attached to one end of said pole, a horseshoe-shaped jaw of smaller size pivotally attached to said fixed jaw and adapted to coöperate therewith, said movable jaw having a cross bar intermediate its ends, a receptacle attached to said fixed jaw, a retracting coil spring connected one end to the pole and the other end to said cross bar and means for forcing the movable jaw beyond the fixed jaw, whereby the fruit is forced from the branch without cutting the stem.

2. In a fruit picker, a pole, a fixed jaw secured to the pole, a movable jaw pivotally mounted thereon and adapted to coöperate with said fixed jaw, a ferrule with a vertically curved extension attached to the end of the pole and a coil spring having one end attached to the end of the pole at a point spaced apart from the end thereof and the other end attached to the movable jaw and adapted to extend over said extension.

In testimony whereof I affix my signature in presence of two witnesses.

COLIN MANN.

Witnesses:
JAMES B. PERKINS,
CHAS. J. MARR.